United States Patent

Sumida et al.

[11] Patent Number: 5,996,358
[45] Date of Patent: Dec. 7, 1999

[54] REFRIGERATING AND AIR-CONDITIONING APPARATUS AND METHOD OF DETERMINING REFRIGERANT COMPOSITION OF REFRIGERATING AND AIR-CONDITIONING APPARATUS

[75] Inventors: Yoshihiro Sumida; Takashi Okazaki; Tomohiko Kasai; Osamu Morimoto; Yoshio Ueno, all of Tokyo, Japan

[73] Assignee: Mitsubishi Denki Kabushiki Kaisha, Tokyo, Japan

[21] Appl. No.: 09/084,505

[22] Filed: May 27, 1998

[30] Foreign Application Priority Data

Aug. 20, 1997  [JP]  Japan .................................. 9-223209

[51] Int. Cl.$^6$ ..................................................... F25B 1/00
[52] U.S. Cl. .................................. 62/129; 62/114; 62/502
[58] Field of Search ............................ 62/129, 125, 126, 62/127, 149, 174, 502, 114, 203, 208, 209, 204, 210

[56] References Cited

U.S. PATENT DOCUMENTS 5,353,604  10/1994  Oguni et al. ........................... 62/502 X
5,626,026   5/1997  Sumida et al. ............................. 62/129
5,651,263   7/1997  Nonaka et al. ........................ 62/502 X
5,737,931   4/1998  Ueno et al. ............................... 62/126

FOREIGN PATENT DOCUMENTS 6-101912  4/1994  Japan .
6-117737  4/1994  Japan .
8-261576  10/1996  Japan .

*Primary Examiner*—Harry B. Tanner
*Attorney, Agent, or Firm*—Burns, Doane, Swecker & Mathis, LLP

[57] ABSTRACT

In the detection of circulating compositions in the cycle of a non-azeotropic refrigerant composed of three or more kinds of refrigerants, there have been drawbacks in that the number of sensors required is large, and large errors are contained in the circulating composition which can be detected. To overcome these drawbacks, the refrigerating and air-conditioning apparatus comprises at least a compressor, a condenser, a pressure reducing device, and an evaporator, and in a refrigerant cycle which uses as a working refrigerant a non-azeotropic refrigerant composed of N kinds (N≧3) of refrigerants and is provided with composition detecting means for detecting the circulating compositions of the non-azeotropic refrigerant, circulating compositions are determined by using (N−2) relations on compositions among a first component to a j-th (2≦j≦N−1) component of the non-azeotropic refrigerant.

8 Claims, 11 Drawing Sheets

1: COMPRESSOR OUTLET
2: CONDENSER OUTLET
3: EVAPORATOR INLET
4: COMPRESSOR INLET

REFRIGERATING AND AIR-CONDITIONING APPARATUS AND METHOD OF DETERMINING REFRIGERANT COMPOSITION OF REFRIGERATING AND AIR-CONDITIONING APPARATUS

BACKGROUND OF THE INVENTION

The present invention relates to a refrigerating and air-conditioning apparatus using a non-azeotropic refrigerant, and more particularly to a refrigerating and air-conditioning apparatus which is capable of operating with high reliability and efficiency by accurately detecting the composition of the refrigerant which circulates in a refrigeration cycle using a non-azeotropic refrigerant in which three or more kinds of refrigerants are mixed.

First, a description will be given of the characteristics of the composition of a refrigerant which is circulated in a cycle of a refrigerating and air-conditioning apparatus using a non-azeotropic refrigerant. FIG. 15 is a gas-liquid equilibrium diagram illustrating the characteristics of a non-azeotropic refrigerant in which two kinds of refrigerants are mixed, and the ordinate represents the temperature, while the abscissa represents a circulating composition (a composition ratio of low-boiling components), the parameter being the pressure. In the case of the two-kinds-mixed non-azeotropic refrigerant, a saturated vapor curve and a saturated liquid curve are determined by the pressure, as shown in FIG. 15. The region located upwardly of the saturated vapor curve indicates a superheated vapor state, the region located downwardly of the saturated liquid curve indicates a supercooled state, and the region located between the saturated vapor curve and the saturated liquid curve indicates a gas-liquid two-phase state. In FIG. 15, Z denotes the circulating composition in a refrigeration cycle; a point 1, an outlet portion of a compressor; a point 2, an outlet portion of a condenser; a point 3, an inlet portion of an evaporator; and a point 4, an inlet portion of the compressor.

In general, in a refrigeration cycle using a non-azeotropic refrigerant, the composition of the refrigerant circulating in the cycle and the composition of the refrigerant charged in the cycle does not necessarily agree with each other. This is because, in the gas-liquid two-phase portion of the refrigeration cycle, which is shown by a point A in FIG. 15, the liquid composition becomes X which is smaller than the circulating composition Z, while the vapor composition becomes Y which is larger than the circulating composition. Particularly in a cycle in which an accumulator is provided in the piping between the outlet of the evaporator and the inlet of the compressor, if the liquid refrigerant accumulates in the accumulator, the circulating composition shows a tendency in which low-boiling components increase more than in the case of the charged composition. This is attributable to the fact that the liquid refrigerant, in which the amount of low-boiling components is smaller (the amount of high-boiling components is larger) than in the case of the charged composition, is accumulated in the accumulator.

In addition, even if the refrigerant in the refrigeration cycle has leaked outside, the circulating compositions in the cycle change. For example, if the leakage of the liquid refrigerant occurs in the gas-liquid two-phase portion shown by the point A in FIG. 15, the refrigerant with a composition X smaller than the circulating composition leaks, so that the circulating composition shows a tendency of becoming larger. On the other hand, if the vapor refrigerant leaks in the gas-liquid two-phase portion, the refrigerant with the composition Y larger than the circulating composition, so that the circulating composition shows a tendency of becoming smaller. Thus, in the cycle using the non-azeotropic refrigerant, the composition of the refrigerant circulating in the cycle changes substantially due to the operating condition of the cycle, the leakage of the refrigerant, and the like.

If the circulating composition in the cycle changes, the relationship between the pressure and the saturation temperature of the refrigerant changes, as can be seen from FIG. 15, and the cooling capabilities also change substantially. Accordingly, to make the cycle stable and allow predetermined capabilities to be demonstrated, it is necessary to accurately detect the circulating composition in the cycle, and optimally control the number of revolutions of the compressor, the amount of opening of a pressure reducing device, and the like in correspondence with the circulating composition.

FIG. 16 shows a configuration of a conventional refrigerating and air-conditioning apparatus using a non-azeotropic refrigerant, which is disclosed in, for example, Japanese Patent Application Publication. In the drawing, reference numeral 1 denotes a compress or; 2, a c on denser; 33, a receiver; 33 a pressure reducing device; and 4, an evaporator, and these component elements are consecutively connected by pipes and constitute a refrigeration cycle. As a refrigerant, a non-azeotropic refrigerant in which two kinds of refrigerants, including a high-boiling component and a low-boiling component, are mixed is used. In addition, a temperature detector 34 and a pressure detector 35 are provided for a receiver 33 at an outlet of the condenser 2, and signals from these detectors are inputted to a composition calculator 10.

With the conventional refrigerating and air-conditioning apparatus using a non-azeotropic refrigerant, which is figured as described above, the vapor of the high-temperature, high-pressure non-azeotropic refrigerant which is compressed by the compressor 1 is condensed and liquefied by the condenser 2, and flows into the receiver 33. This liquid refrigerant is passed through the pressure reducing device 3, where it is converted to a low-temperature, low-pressure gas-liquid two-phase refrigerant, and flows into the evaporator 4, where it is evaporated and returns to the compressor 1. The circulating composition in the cycle is calculated by the composition calculator 10 on the basis of information on the temperature and pressure of the liquid refrigerant which has flown into the receiver 33, the temperature and pressure having been detected by the temperature detector 34 and the pressure detector 35. That is, a gas-liquid equilibrium diagram such as the one shown in FIG. 17 is obtained from the kind of the charged non-azeotropic refrigerant in which two kinds of refrigerants are mixed, as well as the pressure PH detected by the pressure detector 35. If it is assumed that the state of the refrigerant in the receiver 33 is that of a saturated liquid, the circulating composition Z in the cycle can be detected from a point of intersection of the saturated liquid curve and the temperature TH detected by the temperature detector 34, as shown in FIG. 17.

If this basic principle of detection of the circulating composition is expanded, in the case of the two-kinds-mixed non-azeotropic refrigerant, the circulating composition can be detected if the quality of wet vapor, X, (=the flow rate of the mass of refrigerant vapor/the flow rate of the total mass of the refrigerant), as well as the temperature and pressure of the refrigerant at this quality of wet vapor, X, are known. That is, in the case of the two-kinds-mixed non-azeotropic refrigerant, in a case where the pressure P is fixed, the relationship such as the one shown by the dot-dashed line in FIG. 18, which illustrates the conventional basic principle of detection of circulating compositions of the two-kinds-mixed refrigerant, is present between the temperature and the circulating composition Z of the refrigerant at the quality of wet vapor, X, including the saturated vapor curve where the quality of wet vapor, X, =1 and the saturated liquid line where the quality of wet vapor, X, =0. Accordingly, by using this relationship, it is possible to detect the circulating composition in the cycle if the pressure, temperature, and quality of wet vapor of the refrigerant in the gas-liquid two-phase state, including the saturated vapor and the saturated liquid, can be known.

However, although this method can be applied to the two-kinds-mixed refrigerant in which two kinds of refrigerants are mixed, it cannot be applied to a mixed refrigerant in which three or more kinds of refrigerants are mixed. In the case of the two-kinds-mixed refrigerant, if the composition Z1 of the first component can be known, the composition Z2 of the second component can be determined as being (1−Z1). In the case of the three-kinds-mixed refrigerant, on the other hand, even if the composition Z1 of the first component alone can be known, there are infinite combinations of the composition Z2 of the second component and the composition Z3 of the third component, so that it is impossible to determine the overall composition.

A description will be given of this aspect with reference to the gas-liquid equilibrium diagram of a three-kinds-mixed refrigerant shown in FIG. 19. FIG. 19 is a gas-liquid equilibrium diagram of a three-kinds-mixed refrigerant under the conditions where the pressure P is fixed and the temperature T is fixed. The abscissa shows the composition Z1 of the first component, while the ordinate shows the composition Z2 of the second component. The two solid lines in the drawing show the saturated vapor curve and the saturated liquid curve. The region located upwardly of the saturated vapor curve indicates a superheated vapor state, the region located downwardly of the saturated liquid curve indicates a supercooled state, and the region surrounded by the saturated vapor curve and the saturated liquid curve indicates a gas-liquid two-phase state. The dot-dashed line in the drawing indicates the state in which the quality of wet vapor, X, is fixed in the gas-liquid two-phase state. As is apparent from this drawing, in the case of the three-kinds-mixed refrigerant, even if the pressure P, temperature T, and quality of wet vapor, X, of the refrigerant in the gas-liquid two-phase state are known, it can only be known that the circulating composition is present on the dot-dashed line in the drawing, and it is impossible to determine the circulating composition, i.e., the composition of the first component and the composition of the second component of the circulating composition. Incidentally, in the case of the three-kinds-mixed refrigerant, if the composition Z1 of the first component and the composition Z2 of the second component are known, the composition Z3 of the remaining third component is determined uniquely from (1−Z1−Z2).

As a conventional method of detecting circulating compositions of the three-kinds-mixed non-azeotropic refrigerant, a method disclosed in, for example, Japanese Patent Application Laid-Open No. 261576/1996 is known. FIG. 20 is a schematic diagram of a conventional refrigerating and air-conditioning apparatus using a three-kinds-mixed non-azeotropic refrigerant. In the drawing, reference numeral 1 denotes a compressor; 2, a condenser; 3, a pressure reducing device; 4, an evaporator; and 5, an accumulator, and these component elements are consecutively connected by pipes and constitute a refrigeration cycle. As a refrigerant, a non-azeotropic refrigerant in which three kinds of refrigerants having different boiling points are mixed is used. In addition, numeral 41 denotes a bypass pipe provided between an outlet of the condenser 2 and the accumulator 5, and a capillary tube 42 is provided midway in the pipe. Further, a temperature detector 43 and a pressure detector 46 are provided at a suction pipe of the compressor 1, and temperature detectors 44 and 45 are respectively provided before and after the capillary tube 42 of the bypass pipe 41. Signals from these three temperature detectors 43, 44, and 45 and the pressure detector 46 are inputted to a composition calculator 10.

A description will be given of the basic principle of detection of the circulating composition in the conventional refrigerating and air-conditioning apparatus configured as described above and using a non-azeotropic refrigerant. The interior of the accumulator 5 is in a saturated state at the pressure P1, and the saturated vapor of the three-kinds-mixed refrigerant having a composition of y1, y2, and y3 is present in an upper portion thereof, while the saturated liquid having a composition of x1, x2, and x3 is present in a lower portion thereof. The circulating composition in the cycle is identical to y1, y2, and y3, and this circulating composition is calculated on the basis of the signals from the three temperature detectors 43, 44, and 45 and one pressure detector 46. First, the temperature T1 and the pressure P1 within the accumulator 6 are detected by the temperature detector 43 and the pressure detector 46. The saturated vapor composition at the temperature T1 and the pressure P1 is on the saturated vapor curve shown by the solid line in the gas-liquid equilibrium diagram of the tree-kinds-mixed refrigerant in FIG. 21, and it can be appreciated that the circulating composition is also present on the saturated vapor curve.

Next, the inlet temperature T2 and the outlet temperature T3 of the capillary tube 42 of the bypass pipe 41 are detected by the temperature detectors 44 and 45. In the capillary tube portion, the refrigerant undergoes an isenthalpic change, the enthalpy before and the enthalpy after the capillary tube 42 are equal, so that the enthalpy of this portion can be known from the inlet temperature T2 of the capillary tube 42. Accordingly, the temperature, pressure, and enthalpy of the gas-liquid two-phase refrigerant at the outlet portion of the capillary tube 42 become known amounts, so that the quality of wet vapor, X3, can be determined. That is, the temperature T3, the pressure P1, and the quality of wet vapor, X3, of the gas-liquid two-phase refrigerant at the outlet portion of the capillary tube become known amounts. In the gas-liquid equilibrium diagram of the tree-kinds-mixed refrigerant shown in FIG. 21, the composition of the gas-liquid two-phase refrigerant at the quality of wet vapor, X3, at the temperature T3 and the pressure P1 is represented by the broken line, and it can be appreciated that the circulating composition is also present on this broken line.

From the above, it can be seen that the circulating composition is present on the saturated vapor curve at the temperature T1 and the pressure P1 shown in FIG. 21, and is present on the fixed line of the quality of wet vapor, X3, at the temperature T3 and the pressure P1, shown in FIG. 22 which is a gas-liquid equilibrium diagram of the tree-kinds-mixed refrigerant. Accordingly, as shown in FIG. 23 which is a diagram illustrating the basic principle of detection of circulating compositions of a three-kinds-mixed refrigerant, if these two diagrams are superposed on top of the other, the first component y1 and the second component y2 of the circulating composition can be determined as a point of intersection of these two curves, while the third component y3 can be determined as being (1−y1−y2), thereby making it possible to determine the circulating composition of y1, y2, and y3.

However, with such a method of detecting the circulating composition, three temperature detectors and one pressure detector are required. In addition, as can be seen from FIG. 23, the difference between the gradient of the saturated vapor curve at the temperature T1 and the pressure P1 and the gradient of the fixed line of the quality of wet vapor, X3, at the temperature T3 and the pressure P1 is very small in terms of the basic principle. Hence, to determine the circulating composition as the point of intersection of these two curves, it is necessary to accurately identify the two curves. Namely, to accurately identify these two curves, three temperature detectors and one pressure detector which are highly accurate are required, so that there has been a drawback in that the apparatus becomes expensive. In addition, if temperature detectors and a pressure detector of the accuracy used in an ordinary refrigerating and air-conditioning apparatus are used, there has been a drawback in that errors of the two curves become large, with the result that a large error is included in the circulating composition which is determined as the point of intersection, making it impossible to operate the refrigerating and air-conditioning apparatus stably and with high reliability.

With the conventional refrigerating and air-conditioning apparatuses using a non-azeotropic refrigerant, most apparatuses are able to detect the circulating compositions of two-kinds-mixed refrigerants but are unable to detect the circulating compositions of mixed refrigerants in which three or more kinds of refrigerants are mixed. In addition, although some apparatuses have been proposed which are able to detect the circulating compositions of three-kinds-mixed refrigerants, the number of sensors required is large, and high accuracy is required of the sensors, so that there has been a drawback in that the apparatuses become expensive. In addition, in a case where temperature detectors and a pressure detector of the accuracy used in an ordinary refrigerating and air-conditioning apparatus are used, there has been a drawback in that errors of the two curves become large, with the result that a large error is included in the circulating composition which is determined as the point of intersection, making it impossible to operate the refrigerating and air-conditioning apparatus stably and with high reliability.

SUMMARY OF THE INVENTION

The present invention has been devised to overcome the above-described problem, and its object is to provide a refrigerating and air-conditioning apparatus which uses a non-azeotropic refrigerant and which is capable of detecting inexpensively and accurately the circulating composition of a non-azeotropic refrigerant in which three or more kinds of refrigerants are mixed, and which has high reliability and is capable of effecting efficient operation even if the circulating composition in the cycle has changed.

In accordance with a first aspect of the present invention, there is provided a refrigerating and air-conditioning apparatus which has at least a compressor, a condenser, a pressure reducing device, and an evaporator and in which a refrigerant constituted by a non-azeotropic refrigerant in which three or more kinds of refrigerants are mixed is circulated, comprising: composition detecting means for obtaining a relationship among component compositions of one or a plurality of refrigerants of the non-azeotropic refrigerant by detecting the temperature and pressure of the refrigerant, and for determining circulating compositions of the refrigerant circulating in a refrigeration cycle by using the relationship among component compositions of the non-azeotropic refrigerant set in advance.

In a refrigerating and air-conditioning apparatus in accordance with a second aspect of the present invention, the relationship among component compositions of the non-azeotropic refrigerant set in advance is derived from information on circulating compositions obtained from an experiment or a simulation.

In a refrigerating and air-conditioning apparatus in accordance with a third aspect of the present invention, the relationship among component compositions of the non-azeotropic refrigerant set in advance is derived by information on gas-liquid equilibrium compositions, such as a charged composition and a vapor composition which is in equilibrium with a liquid composition identical to the charged composition, and a liquid composition which is in equilibrium with a vapor composition identical to the charged composition.

In a refrigerating and air-conditioning apparatus in accordance with a fourth aspect of the present invention, a non-azeotropic refrigerant composed of three kinds of refrigerants R.32, R.125, and R.134a is used.

In accordance with a fifth aspect of the present invention, there is provided a refrigerating and air-conditioning apparatus which has at least a compressor, a condenser, a pressure reducing device, and an evaporator and in which a refrigerant constituted by a non-azeotropic refrigerant in which N kinds ($N \geq 3$) of refrigerants are mixed is circulated, wherein circulating compositions are determined by using at least (N−2) relations on compositions among a first component to a j-th ($2 \leq j \leq N-1$) component of the non-azeotropic refrigerant.

In a refrigerating and air-conditioning apparatus in accordance with a sixth aspect of the present invention, the at least (N−2) relations on compositions among the first component to the j-th ($2 \leq j \leq N-1$) component of the non-azeotropic refrigerant are set on the basis of circulating composition information obtained from an experiment or a simulation.

In a refrigerating and air-conditioning apparatus in accordance with a seventh aspect of the present invention, the at least (N−2) relations on compositions among the first component to the j-th ($2 \leq j \leq N-1$) component of the non-azeotropic refrigerant are set on the basis of information on gas-liquid equilibrium compositions, such as a charged composition and a vapor composition which is in equilibrium with a liquid composition identical to the charged composition, and a liquid composition which is in equilibrium with a vapor composition identical to the charged composition.

In accordance with an eighth aspect of the present invention, in a refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, there is provided a method of determining refrigerant compositions of the refrigerating and air-conditioning apparatus, comprising the steps of: inputting the temperature of a high-pressure liquid refrigerant and the temperature and pressure of a low-pressure gas-liquid two-phase refrigerant in which the high-pressure liquid refrigerant is subjected to isenthalpic expansion; assuming the composition of one component of the non-azeotropic refrigerant; assuming another circulating composition by using a relationship of composition between the component of the non-azeotropic refrigerant whose composition has been assumed and another component;

calculating the enthalpy of the high-pressure liquid refrigerant by using an assumed value of the circulating composition and the temperature of the high-pressure liquid refrigerant; and calculating the circulating composition on the basis of the temperature and pressure of the gas-liquid two-phase refrigerant and the high-pressure liquid refrigerant enthalpy and for comparing the same with the assumed value of the circulating composition.

In accordance with a ninth aspect of the present invention, in a refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, there is provided a method of determining refrigerant compositions of the refrigerating and air-conditioning apparatus, comprising the steps of: inputting the temperature of a high-pressure liquid refrigerant and the temperature and pressure of a low-pressure gas-liquid two-phase refrigerant in which the high-pressure liquid refrigerant is subjected to isenthalpic expansion; calculating the enthalpy of the high-pressure liquid refrigerant by using the temperature of the high-pressure liquid refrigerant; calculating the composition of one component of the non-azeotropic refrigerant on the basis of the temperature and pressure of the gas-liquid two-phase refrigerant and the high-pressure liquid refrigerant enthalpy; and determining the composition of another component by using a relationship of composition between the component of the non-azeotropic refrigerant whose composition has been calculated and the other component.

BRIEF DESCRIPTION OF THE DRAWINGS

In the accompanying drawings:

FIG. 2 is a diagram illustrating changes in the circulating compositions of R. 32, R.125, and R.134a;

FIG. 11 is a diagram illustrating gas-liquid equilibrium compositions of R.32, R.125, and R.134a;

FIG. 12 is a diagram illustrating gas-liquid equilibrium compositions of R.32, R.125, and R.134a;

DETAILED DESCRIPTION OF THE PREFERRED EMBODIMENTS

First Embodiment

Figure 1:
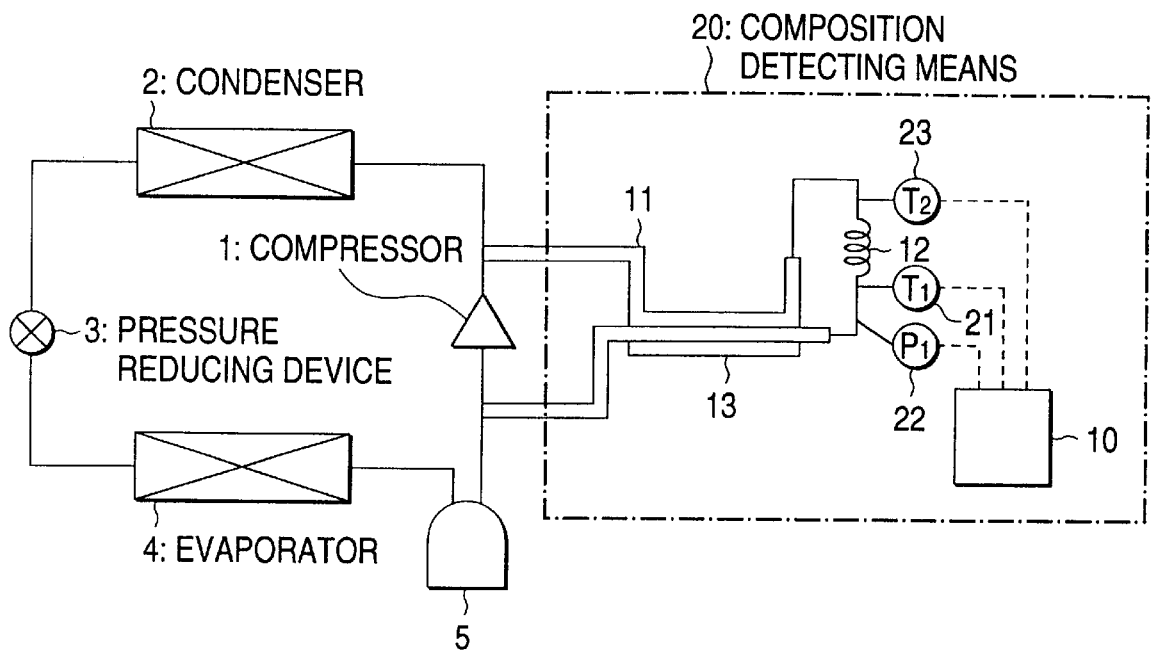
FIG. 1 is a schematic diagram of a refrigerant circuit illustrating an embodiment of the present invention.

FIG. 1 is a diagram of a refrigerant circuit which illustrates an embodiment of the present invention, and those parts which are similar to those of the conventional apparatus will be denoted by the same reference numerals. In the drawing, reference numeral 1 denotes a compressor; 2, a condenser; 3, a pressure reducing device; 4, an evaporator; and 5, an accumulator, and these component elements are consecutively connected by pipes and constitute a refrigeration cycle. As a refrigerant, a non-azeotropic refrigerant in which three kinds of refrigerants are mixed (the charged composition being 23 wt. % for R.32, 25 wt. % for R.125, and 52 wt. % for R.134a) is used. In addition, reference numeral 20 denotes a composition detecting means, and a method disclosed in, for example, Japanese Patent Application Laid-Open No. 75280/1996 is used. Numeral 11 denotes a bypass pipe for bypassing a discharge pipe and a suction pipe of the compressor 1, and a capillary tube 12 is provided midway in the pipe. Numeral 13 denotes a heat exchanger for cooling the non-azeotropic refrigerant which flows into the capillary tube 12 from the high-pressure side of the bypass pipe 11, and the heat exchanger 13 is constituted by a double-pipe heat exchanger combining the low-pressure side of the bypass pipe 11. Further, a temperature detector 21 and a pressure detector 22 are provided at an outlet portion of the capillary tube 12, while a temperature detector 23 is provided at an inlet portion of the capillary tube 12. Signals from these detectors are inputted to a composition calculator 10 using a microcomputer, and are calculated.

Figure 2:
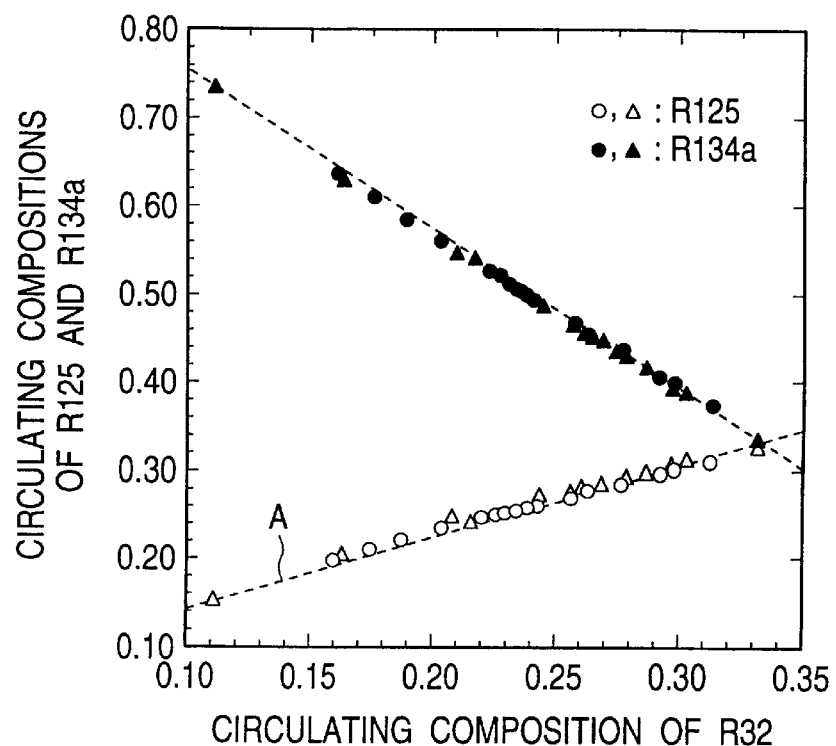

Next, to illustrate a change in the circulating composition, FIG. 2 shows an example of the results of actual measurement of a circulating composition for a refrigeration cycle, in which a three-kinds-mixed non-azeotropic refrigerant in which R.32, R.125, and R.134a are charged at a composition ratio of 23 wt. %, 25 wt. %, and 52 wt. %. FIG. 2 shows an example of results of measurement of the circulating composition using a gas chromatograph at a time when the amount of liquid refrigerant accumulated in an accumulator 6 was changed and when the vapor refrigerant or the liquid refrigerant was made to leak in the cycle. The abscissa represents the circulating composition of R.32, while the ordinate represents the circulating composition of R.125 (unfilled points in the drawing) and R.134a (filled points in the drawing). With respect to the charged composition of 23 wt. %, 25 wt. %, and 52 wt. %, the circulating composition changes substantially from 11 wt. %, 15 wt. %, and 74 wt. % to 33 wt. %, 33 wt. %, and 34 wt. %. In addition, it can be appreciated that a fixed relationship indicated by the broken line A in the drawing holds between the circulating composition of R.32 and the circulating composition of R.125. Namely, if the relation shown by this broken line A is used, if only the circulating composition Z1 of R.32 is detected, the circulating composition Z2 of R.125 can be determined from the relation of the broken line A, and the circulating composition Z3 of R.134a is determined from $(1-Z1-Z2)$, with the result that the circulating compositions of R.32, R.125, and R.134a can be determined.

In the present invention, as a result of detection of the temperature and pressure of the refrigerant, the relationship between the composition ratio of one kind of refrigerant and the composition ratio of a non-azeotropic refrigerant in which a plurality of kinds of refrigerants are mixed. At the same time, as shown in FIG. 2, the relationship of the composition ratio of the non-azeotropic refrigerant can be determined and set in advance from the circulating composition information obtained through an experiment or simulation. Hence, the circulating compositions of the refrigerant which are circulated in the refrigeration cycle can be determined simply by determining a point of intersection of the two curves by using this data, thereby making it possible to use highly reliable data on the circulating compositions accurately, simply, and inexpensively.

Figure 3:
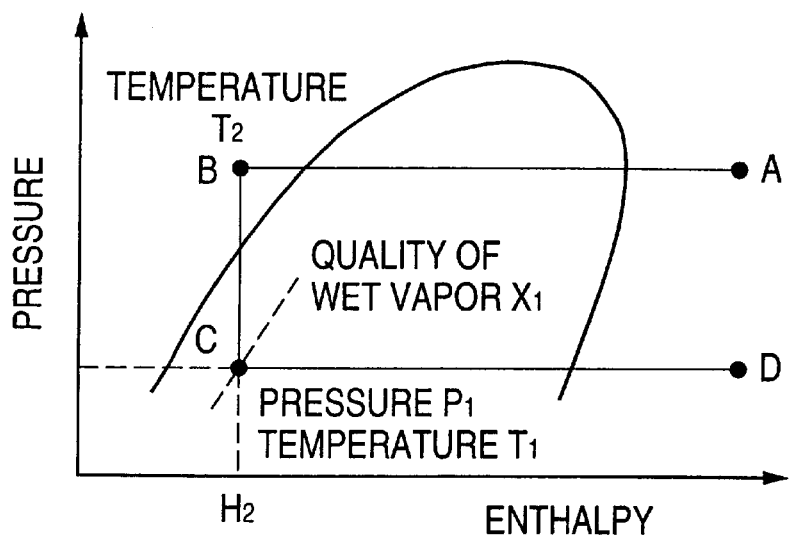
FIG. 3 is a diagram illustrating the operation of a circulating-composition detecting means.

Hereafter, a description will be given of the basic principle of detection of the circulating compositions of the three-kinds-mixed refrigerant of R.32, R.125, and R.134a. The operation of the circulating composition detecting means shown in FIG. 1 will be described with reference to the pressure-enthalpy diagram shown in FIG. 3. Part (point A in the drawing) of the refrigerant, which was discharged from the compressor 1 and entered the bypass pipe 11, is cooled and liquefied (point B in the drawing) by the double-pipe heat exchanger 13, is subjected to pressure reduction by the capillary tube 12, and is thereby converted to a low-pressure, gas-liquid two-phase refrigerant (point C in the drawing). This two-phase refrigerant is evaporated on heating by the double-pipe heat exchanger 13, and converges (point D in the drawing) at the suction pipe of the compressor 1. The refrigerant temperature T2 at the inlet portion of the capillary tube at the point B is detected by the temperature detector 23, and the enthalpy H2 at this point can be known from this temperature. Since the change of the refrigerant in the capillary tube portion is an isenthalpic change, so that the enthalpy at the outlet portion of the capillary tube at the point C is also equal to H2. The pressure P1 at the outlet portion of the capillary tube at the point C is detected by the pressure detector 22, and the quality of wet vapor, X1, (=the flow rate of the mass of refrigerant vapor/the flow rate of the total mass of the refrigerant) can be known from the pressure P1 and the enthalpy H2. Namely, the temperature T1, pressure P1, and quality of wet vapor, X1, of the gas-liquid two-phase refrigerant at the outlet portion of the capillary tube can be detected from the information from the two temperature detectors 21 and 23 and one pressure detector 22.

Figure 4:
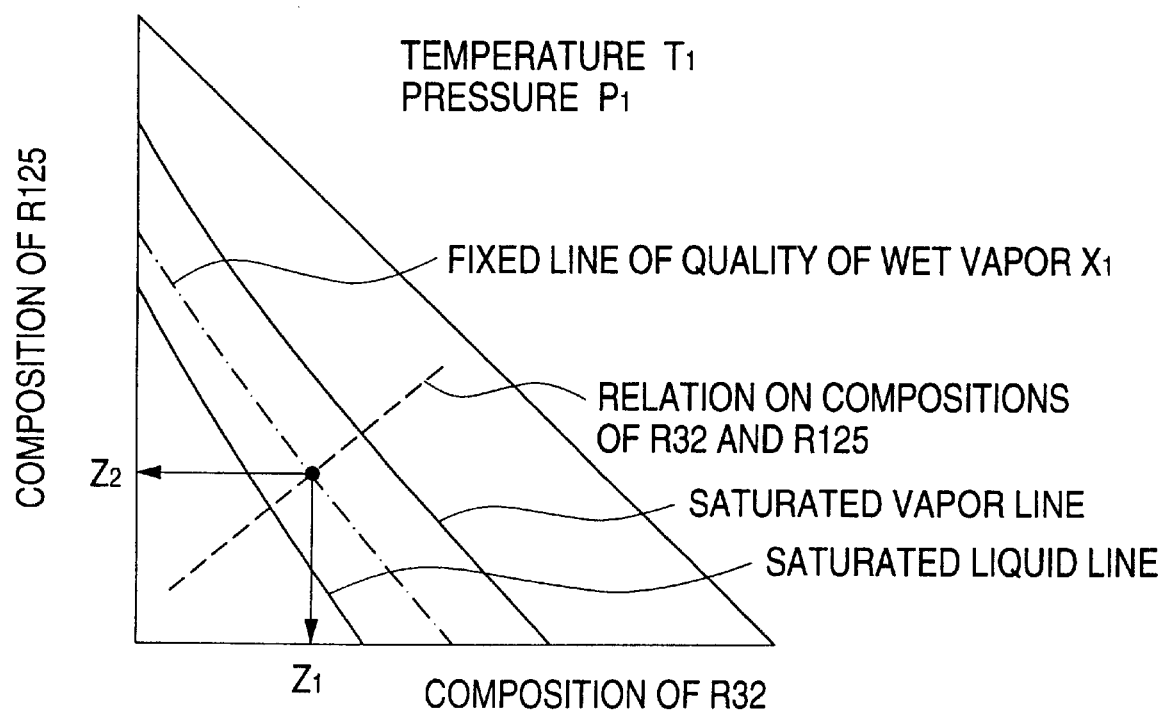
FIG. 4 is a diagram illustrating the basic principle of detection of circulating compositions.

FIG. 4 shows the basic principle of detection of the circulating composition, and illustrates the state of gas-liquid equilibrium of R.32, R.125, and R.134a. The ordinate represents the composition of R.125, and the abscissa represents the composition of R.32. The two solid lines in the drawing respectively show the saturated vapor curve and the saturated liquid curve, and the region located between these two curves represents the gas-liquid two-phase state. In addition, the dot-dashed line in the drawing is a curve which shows the gas-liquid two-phase state with X1 fixed. From the information on the temperature T1, pressure P1, and quality of wet vapor, X1, of the gas-liquid two-phase refrigerant at the outlet portion of the capillary tube 12 detected by the composition detecting means 20, it can be appreciated that the circulating composition in the cycle is present on the dot-dashed line in FIG. 4. It should be noted that, in the above-described calculation, enthalpy and the like can be determined from the detected temperature and pressure on the basis of the physical properties which are stored in a storage means of a microcomputer in the composition calculator 10.

Meanwhile, the broken line in FIG. 4 shows the relation on the compositions of R.32 and R.125 which is obtained from information on the circulating compositions of R.32, R.125, and R.134a shown in FIG. 2, and the circulating compositions are present on this broken line. Accordingly, the circulating composition Z1 of R.32 and the circulating composition Z2 of R.125 are determined as a point of intersection of the dot-dashed line and broken line shown in FIG. 4, and the circulating composition Z3 of R.134a is determined from $(1-Z1-Z2)$, thereby making it possible to determine the circulating compositions of R.32, R.125, and R.134a.

Incidentally, FIG. 4 is a diagram which is determined from values of the physical properties of the refrigerant corresponding to the composition ratio of the three kinds of refrigerants. For example, since both the ordinate and the abscissa are shown by the ratio of 0-1, i.e., since only R.125 is zero on the abscissa and only R.32 is zero on the ordinate, destruction is not present in a triangular region in the upper right half portion, with the result that diagram is plotted as a region in the lower left half portion.

Figure 23:
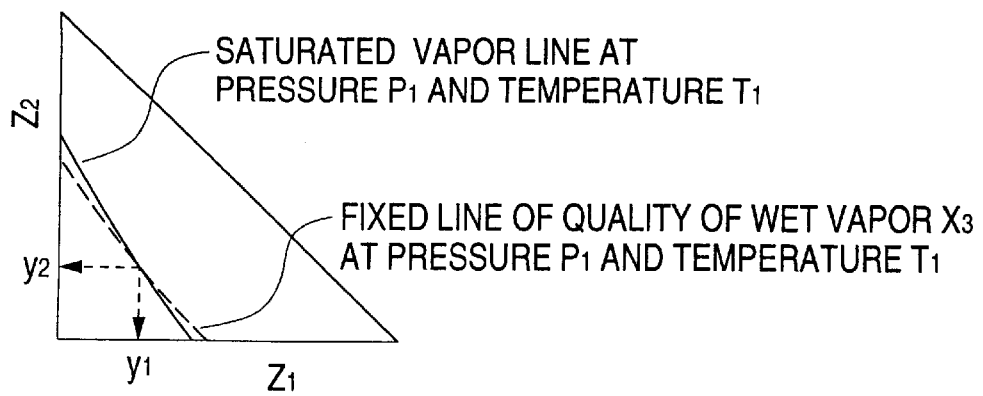
FIG. 23 is a diagram illustrating the conventional basic principle of detection of circulating compositions of the non-azeotropic refrigerant in which three kinds of refrigerants are mixed.

As shown in FIG. 4, as for the fixed line of the quality of wet vapor, X1, (dot-dashed line in FIG. 4) at the temperature T1 and the pressure P1 and the relation on the compositions of R.32 and R.125 (broken line in FIG. 4), inclinations of their curves are substantially different, and it is easy to determine the point of intersection of the curves in comparison with the conventional method shown in FIG. 23. That is, as for the temperature detectors and the pressure detector necessary for determining the curves, even if highly accurate detectors are not used, the circulating composition can be determined accurately. In addition, since only two temperature detectors and one pressure detector are required as the sensors, the number of sensors can be fewer than in the conventional method, and the required accuracy is not high, so that there is an advantage in-that the apparatus can be made inexpensive.

Although, in this embodiment, a description has been given of the method of determining the circulating composition by using the relation on the compositions of R.32 and R.125 stored in the microcomputer of the composition calculator, a similar effect can be exhibited even if the relation on the compositions of R.32 and R.134a or the relation on the compositions of R.125 and R.134a is used. In addition, although the above description has been given by citing specific refrigerants as an example, it goes without saying that any refrigerants may be used insofar as a mixed refrigerant composed of a combination of non-azeotropic refrigerants is used. Although, in this embodiment, a description has been given of the case of a three-kinds-mixed refrigerant, a similar effect can be exhibited by using a relation on compositions even if a non-azeotropic refrigerant in which more than three kinds refrigerants are mixed, such as a four-kinds-mixed refrigerant, is used. For instance, in the case of the four-kinds-mixed refrigerant, by using the relation on the compositions of the first component and the second component as well as the relation on the compositions of the first component and the third component, the circulating compositions can be simply detected through handling similar to that of the two-kinds-mixed refrigerant.

In addition, although, in this embodiment, a description has been given of the method of determining the circulating composition by the composition detecting means 20 on the basis of information on the temperature, pressure, and quality of wet vapor of the gas-liquid two-phase state refrigerant at the outlet portion of the capillary tube 12, the present invention is not limited to the same. For example, an arrangement may be provided such that a curve where the circulating composition is present is determined from information on the temperature, pressure, and quality of wet vapor of the refrigerant in the gas-liquid two-phase state in the cycle, including the saturate vapor state and the saturated liquid state, and the circulating composition is determined from the point of intersection of this curve and the relation on the compositions. Although, in the above description, a example has been shown in which the capillary tube is provided at the bypass pipe, and a curve where the circulating composition is present is determined from the pressure and the temperature before and after the capillary tube, the upstream-side temperature and the downstream-side temperature and pressure before and after the pressure reducing device 3, i.e., LEV, may be detected though it differs between cooling and heating. Still alternatively, the temperature and pressure at the outlet of the condenser or at the outlet of the evaporator on the downstream side may be used.

In general, if the circulating composition changes, the thermal characteristic value changes. For example, if the liquid is excessively accumulated in the accumulator and the circulating composition changes, the saturation temperature with respect to the pressure changes, and the condensing temperature cannot be controlled to a fixed level, with the result that the capabilities of the heat exchanger decline and the capabilities of the heating operation decline.

In particular, in the case of a refrigeration cycle for controlling a multiple system capable of simultaneously operating a plurality of indoor units, it is important to control the condensing temperature and the evaporation temperature to fixed levels, and superheat control and the like are effected on the basis of such control. In accordance with the present invention, even in such a multiple configuration, the circulating composition can be detected accurately, the intended performance of the refrigerating apparatus can be ensured on a stable basis, and highly reliable operation can be effected in whatever mode the operation is performed.

Although, in the above description, the relationship among the component compositions of the non-azeotropic refrigerant has been described by citing the circulating compositions of R.32, R.125, and R.134a as an example, it goes without saying that the present invention is not limited to the same. For example, by taking into consideration the effect on the global warming and the improvement of the performance of the refrigeration cycle, particularly the heat exchanger, and the like, it is possible to adopt various combinations of refrigerants, including R.32, R.134a, and R.290; R.32, R.134a, and R.600a; R.32, R.125, R.134a, and R.290; R.32, R.125, R.134a, and R.143a; and R.32, R.125, R.134a, and R.600a, among others. As the circulating compositions of R.32, R.125, and R.134a, relationships among the component compositions of 25 wt. %, 15 wt. %, and 60 wt. % are also possible for the description of the charged composition of 23 wt. %, 25 wt. %, and 52 wt. %.

Second Embodiment

Figure 5:
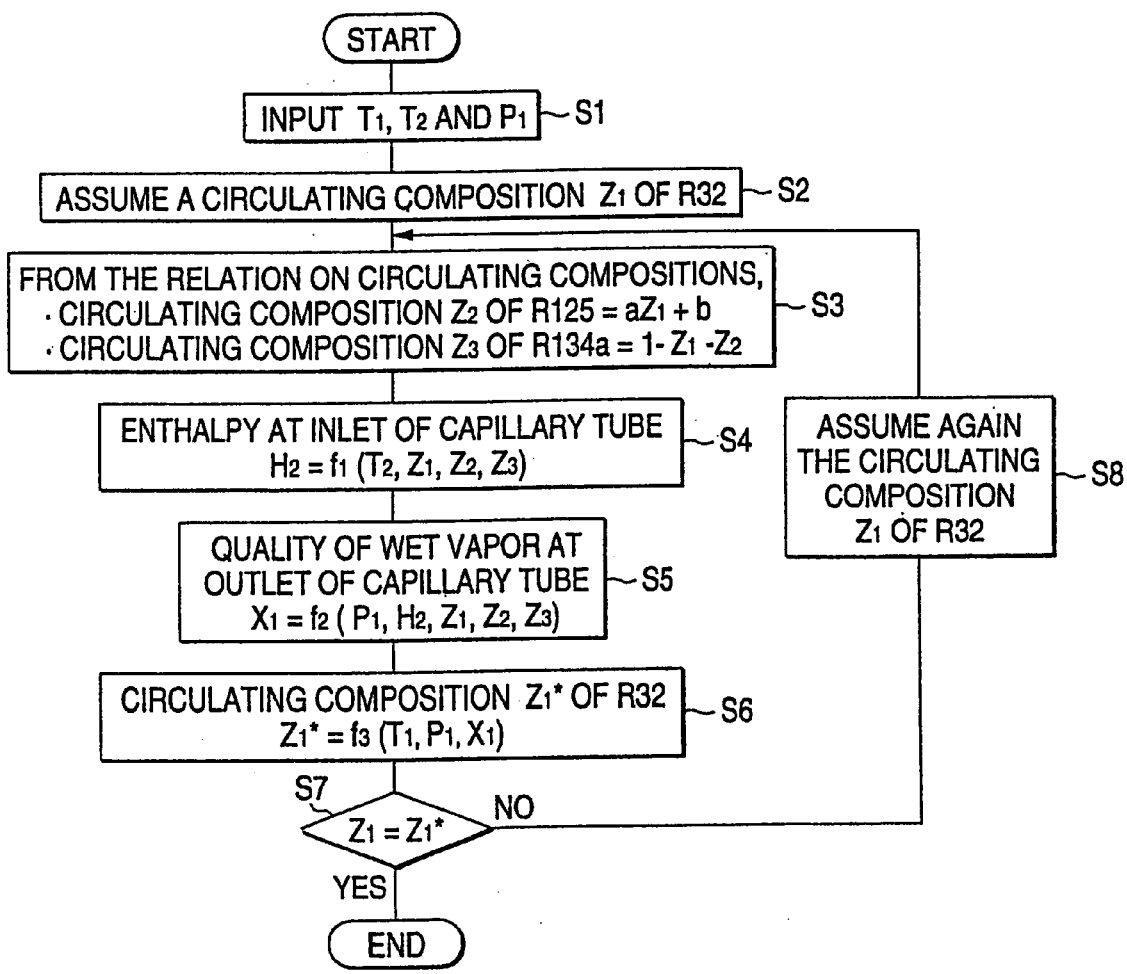
FIG. 5 is a flowchart for detecting circulating compositions illustrating another embodiment of the present invention.
Figure 6:
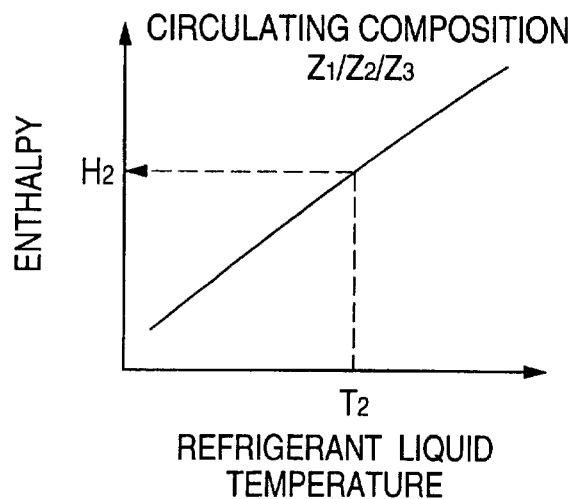
FIG. 6 is a diagram illustrating the relationship among the refrigerant liquid temperature, enthalpy, and composition.
Figure 7:
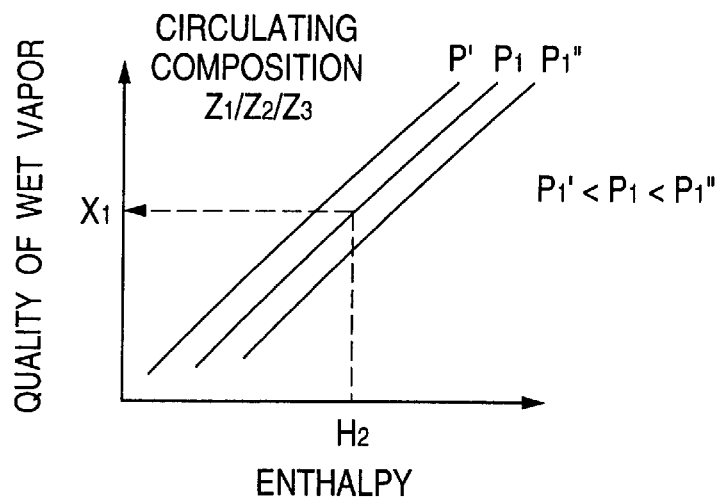
FIG. 7 is a diagram illustrating the relationship among enthalpy, pressure, quality of wet vapor, and composition.
Figure 8:
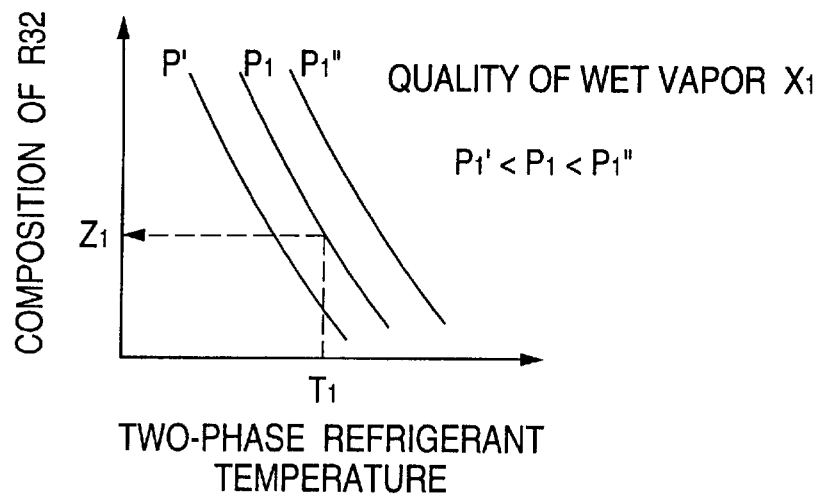
FIG. 8 is a diagram illustrating the relationship among two-phase refrigerant temperature, pressure, quality of wet vapor, and composition.

FIG. 5 is a flowchart for detecting circulating compositions, which illustrates another embodiment of the present invention. When the operation of the composition calculator 10 is started, in Step S1, the capillary tube outlet temperature T1, the capillary tube inlet temperature T2, and the capillary tube outlet pressure P1 are first fetched from the temperature detectors 21 and 23 and the pressure detector 22, respectively, into the composition calculator 10 inside the composition detecting means 20. Next, in Step S2, the circulating composition Z1 of R.32 is assumed among the circulating compositions of R.32, R.125, and R.134a. In Step S3, the relation on the compositions of R.32 and R.125 shown in FIG. 2 or FIG. 4 is approximated as being $Z2 = a \times Z1 + b$ (a, b are constants), the circulating composition Z2 of R.125 is calculated by using the circulating composition of R.32 assumed in Step S2, and the circulating composition Z3 of R.134a is calculated from $(1 - Z1 - Z2)$. In Step S4, the refrigerant enthalpy at the inlet portion of the capillary tube 12 is calculated from the inputted capillary tube inlet temperature T2 and the circulating compositions Z1, Z2, and Z3. That is, the relationship such as the one shown in FIG. 6, which illustrates the relationship, is present among the temperature, composition, and enthalpy of the liquid refrigerant, and if this relationship is set and stored in advance in the composition calculator 10 as $$H2 = f1(T2, Z1, Z2, Z3),$$

then the enthalpy H2 at the inlet portion of the capillary tube can be calculated from the temperature T2 at the inlet portion of the capillary tube and the circulating compositions Z1, Z2, and Z3 by using this relation. In Step S5, the quality of wet vapor, X1, at the outlet portion of the capillary tube is calculated from the pressure P1 at the outlet of the capillary tube 12, and the enthalpy H2 and the assumed values of circulating compositions Z1, Z2, and Z3 which were determined in Step S4. Namely, among the pressure, enthalpy, composition, and quality of wet vapor of the non-azeotropic refrigerant, the relationship such as the one shown in FIG. 7 is present, and if this relationship is set and stored in advance in the composition calculator 10 as $$X1 = f2(P1, H2, Z1, Z2, Z3),$$

then the quality of wet vapor, X1, of the refrigerant at the outlet portion of the capillary tube 12 can be calculated by using this relation. Further, in Step S6, the circulating composition Z1* of R.32 is calculated from the temperature T1, pressure P1, and quality of wet vapor, X1, at the outlet portion of the capillary tube 12. Namely, with the non-azeotropic refrigerant in the gas-liquid two-phase state, among the pressure, temperature, quality of wet vapor, and composition, the relationship such as the one shown in FIG. 8 is present, and if this relationship is set and stored in advance in the composition calculator 10 as $$Z1^* = f3(T1, P1, X1)$$

then the circulating composition Z1* of R.32 can be calculated from the temperature T1, pressure P1, and quality of wet vapor, X1, at the outlet portion of the capillary tube 12 by using this relation. In Step S7, a comparison is made between the circulating composition Z1* of R.32 and the circulating composition Z1 of R.32 assumed in Step S2, and if they agree with each other within a predetermined range, the circulating compositions can be determined as being Z1, Z2, and Z3. If they do not agree with each other, the circulating composition of R.32 is assumed again in Step S8, and the operation returns to Step S3 to perform the aforementioned calculation, and the calculation is continued until they agree with each other within the predetermined range.

If, in Step 7, the two circulating compositions of R.32 agree with each other in the predetermined range, i.e., a range in which the number of repetitions of calculation is reduced without deteriorating the accuracy, the circulating compositions can be determined. However, if they fall outside this range, it suffices if the calculation is continued by setting as a new assumptive value of Z1 an average value of the circulating composition Z1* of R.32 and the circulating composition Z1 of R.32 assumed in Step S2, i.e., a value obtained by dividing an added value of the two circulating compositions by two. P1' and P1" in FIGS. 7 and 8 show the relationship in the relative magnitude with respect to P1. In accordance with the present invention, by using the relation on the compositions of R.32 and R.125, the determination of the circulating compositions of a three-kinds-mixed refrigerant having two degrees of freedom can be made only on the basis of the composition of R.32, and the circulating compositions can be detected by a relatively simple detection algorithm similar to that of the two-kinds-mixed refrigerant.

The above-described calculation can be easily obtained by calculating the detected input signals and the data stored and set in the storage device of the microcomputer by using an arithmetic processor or the like.

Although it has been described above that, by using the relation on the compositions of R.32 and R.125, the determination of the circulating compositions of a three-kinds-mixed refrigerant having two degrees of freedom can be made only on the basis of the composition of R.32, and the circulating compositions can be detected by a relatively simple detection algorithm similar to that of the two-kinds-mixed refrigerant, the determination can be made on the basis of any refrigerant, or a refrigerant other than the aforementioned refrigerants.

Third Embodiment

Figure 9:
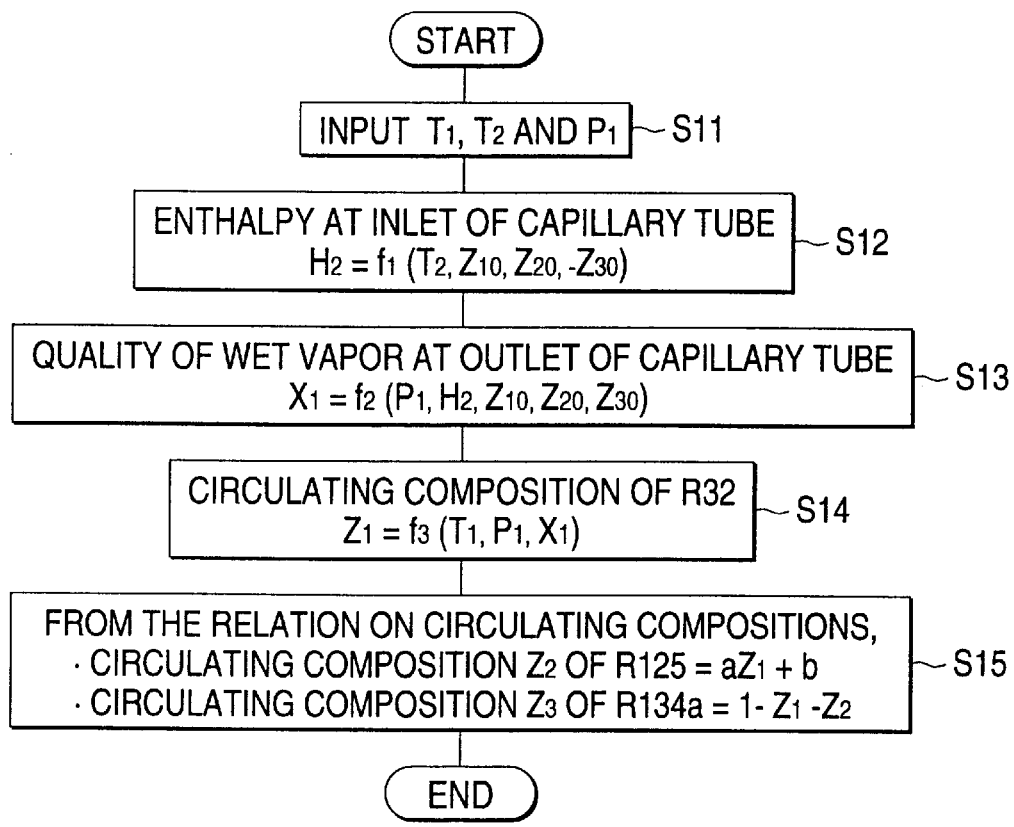
FIG. 9 is a flowchart for detecting circulating compositions illustrating still another embodiment of the present invention.
Figure 10:
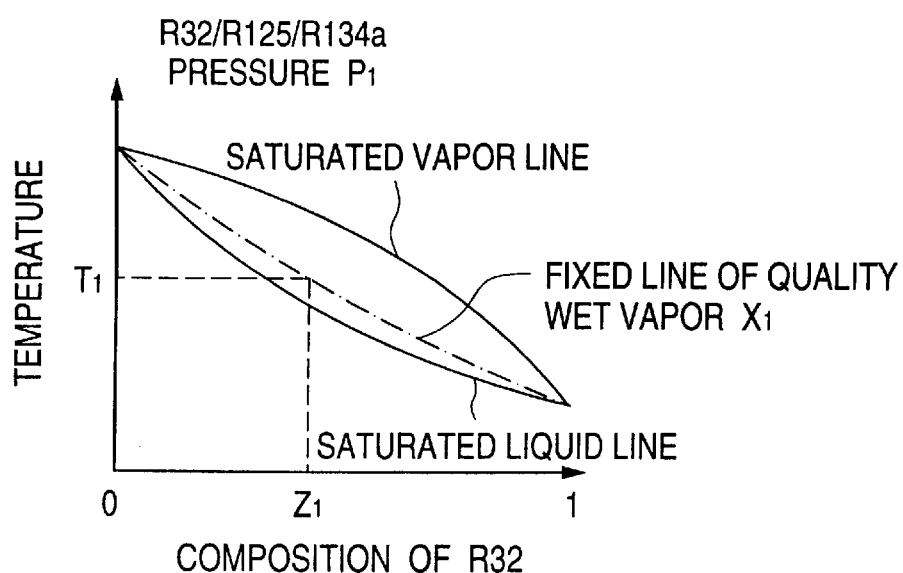
FIG. 10 is a diagram illustrating the relationship among temperature, pressure, quality of wet vapor, and composition.

FIG. 9 is a flowchart for detecting circulating compositions, which illustrates still another embodiment of the present invention. When the operation of the composition calculator 10 is started, in Step S11, the capillary tube outlet temperature T1, the capillary tube inlet temperature T2, and the capillary tube outlet pressure P1 are first fetched from the temperature detectors 21 and 23 and the pressure detector 22, respectively, into the composition calculator 10 inside the composition detecting means 20. Next, in Step S12, the refrigerant enthalpy at the inlet portion of the capillary tube 12 is calculated from the inputted capillary tube inlet temperature T2 and the charged compositions Z10, Z20, and Z30 which are known amounts. That is, if the relationship concerning the temperature and enthalpy of the liquid refrigerant in the charged compositions which are known amounts is set and stored in advance in the composition calculator 10 as $$H2 = f1(T2, Z10, Z20, Z30),$$

then the enthalpy H2 at the inlet portion of the capillary tube can be calculated from the temperature T2 at the inlet portion of the capillary tube and the charged compositions Z10, Z20, and Z30 by using this relation. In Step S13, the quality of wet vapor, X1, at the outlet portion of the capillary tube is calculated from the pressure P1 at the outlet of the capillary tube 12, and the enthalpy H2 and the assumed values of charged compositions Z10, Z20, and Z30 which were determined in Step S12. Namely, if the relationship concerning the quality of wet vapor, pressure, and enthalpy of the mixed refrigerant having the charged compositions of Z10, Z20, and Z30 is set and stored in advance in the composition calculator 10 as $$X1 = f2(P1, H2, Z10, Z20, Z30),$$

then the quality of wet vapor, X1, of the refrigerant at the outlet portion of the capillary tube 12 can be calculated by using this relation. Further, in Step S14, the circulating composition Z1 of R.32 is calculated from the temperature T1, pressure P1, and quality of wet vapor, X1, at the outlet portion of the capillary tube 12. Namely, if the relation on the compositions of R.32 and R.125 shown in FIG. 2 is used for the three-kinds-mixed refrigerant of R.32, R.125, and R.134a, the degree of freedom of composition becomes one, and handling similar to that of the two-kinds-mixed refrigerant becomes possible. With the two-kinds-mixed refrigerant, among the pressure, temperature, quality of wet vapor, and composition, the relationship such as the one shown in FIG. 10 is present, and if this relationship is set and stored in advance in the composition calculator 10 as $$Z1 = f3(T1, P1, X1)$$

then the circulating composition Z1 of R.32 can be calculated from the temperature T1, pressure P1, and quality of wet vapor, X1, at the outlet portion of the capillary tube 12 by using this relation. In Step S15, the relation on the compositions of R.32 and R.125 is approximated from the circulating composition Z1 of R.32 as being Z2=a×Z1+b (a, b are constants), the circulating composition Z2 of R.125 is calculated, and the circulating composition Z3 of R.134a is calculated from (1−Z1−Z2), thereby determining the circulating compositions Z1, Z2, and Z3.

Accordingly, in accordance with the present invention, the relation on the compositions of R.32 and R.125 are used, and compositions at the timed when values of the physical properties, such as the enthalpy and quality of wet vapor of the refrigerant, are determined are used as charged compositions. As a result, in comparison with the flowchart for detecting circulating compositions, shown in FIG. 5, a loop for determining the convergence of an assumed circulating composition becomes unnecessary, thereby making it possible to substantially reduce the calculating time required for detection of circulating compositions.

Although, in the above-described embodiment, a description has been given of the method in which the compositions at the time of determination of values of the physical properties, such as the enthalpy of the refrigerant and the quality of wet vapor of the refrigerant, are calculated by using the charged compositions which are known amounts, the present invention is not limited to the same. For instance, an arrangement may be provided such that circulating compositions which occur frequently in the operation of the refrigeration cycle, and values of the physical properties, such as the enthalpy of the refrigerant and the quality of wet vapor of the refrigerant, are determined by using the circulating compositions. Still alternatively, the compositions at the time of determination of values of the physical properties, such as the enthalpy of the refrigerant and the quality of wet vapor of the refrigerant, may be changed depending on the operation mode such as cooling and heating. For example, results of calculation with higher accuracy can be obtained if, during cooling when the variation of the amount of refrigerant is small, the charged compositions which are easily known amounts are set as Z10, Z20, and Z30, whereas, during heating, the composition ratio which can be estimated from the surplus amount in the receiver is set as Z10, Z20, and Z30.

Fourth Embodiment

Figure 11:
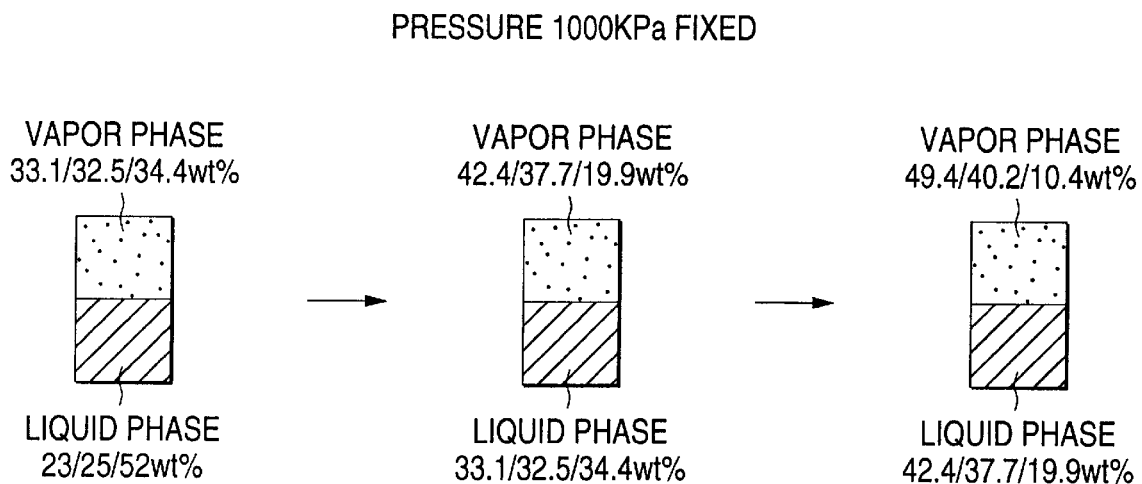
Figure 12:
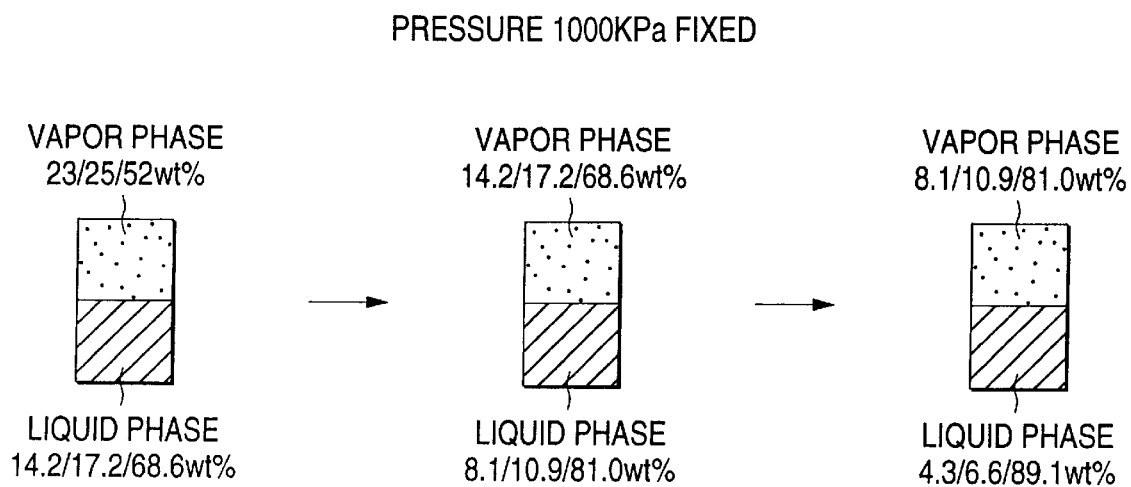
Figure 13:
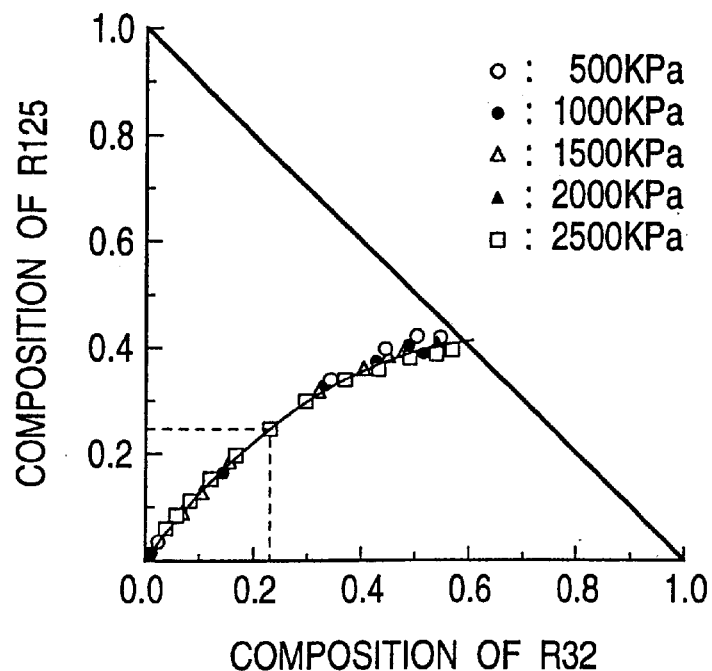
FIG. 13 is a diagram illustrating relation on compositions of R.32 and R.125 identified from the gas-liquid equilibrium compositions.

FIGS. 11 and 12 are diagrams illustrating gas-liquid equilibrium compositions of R.32, R.125, and R.134a for illustrating a method of identifying the relation on the compositions of R.32 and R.125 in accordance with a further embodiment of the present invention. The composition of vapor which is in equilibrium with a saturated liquid of a certain composition of a non-azeotropic refrigerant, or the composition of a liquid which is in equilibrium with saturated vapor of a certain composition, can be determined uniquely from pressure. In FIG. 11, with the pressure fixed at 1000 kPa, a vapor composition which is in equilibrium with a saturated liquid of 23 wt. %, 25 wt. %, and 52 wt. % which is a charged composition of R.32, R.125, and R.134a is first determined in a left-end drawing. Then, a vapor composition which is in equilibrium with a saturated liquid identical to this vapor composition is determined in a central drawing, and is similarly determined in a right-end drawing. In FIG. 12, with the pressure fixed at 1000 kPa, a liquid composition which is in equilibrium with saturated vapor of 23 wt. %, 25 wt. %, and 52 wt. % which is a charged composition of R.32, R.125, and R.134a is first determined in a left-end drawing. Then, a liquid composition which is in equilibrium with saturated vapor identical to this liquid composition is determined in a central drawing, and is similarly determined in a right-end drawing. From the left-end drawings of FIGS. 11 and 12 alone, it is possible to obtain the relationship concerning the composition ratio from information on the gas-liquid equilibrium compositions, but speedy and reliable data can be obtained from FIGS. 11 and 12 as a method for obtaining an operating range of the refrigeration cycle and the region of the relationship concerning the composition ratio in the region of the composition ratio at the time of an abnormality. FIG. 13 is a diagram illustrating the relation on the compositions of R.32 and R.125 identified from the gas-liquid equilibrium compositions, and is a diagram in which a similar calculation is made in the pressure range of 50–2500 kPa, and the vapor compositions and liquid compositions are plotted with the abscissa representing the composition of R.32 and the ordinate representing the composition of R.125. As can be appreciated from the drawing, a fixed relationship is present between the composition of R.32 and the composition of R.125 in these equilibrium compositions. The solid line in the drawing represents the relation on the compositions determined by the method of least squares.

Figure 14:
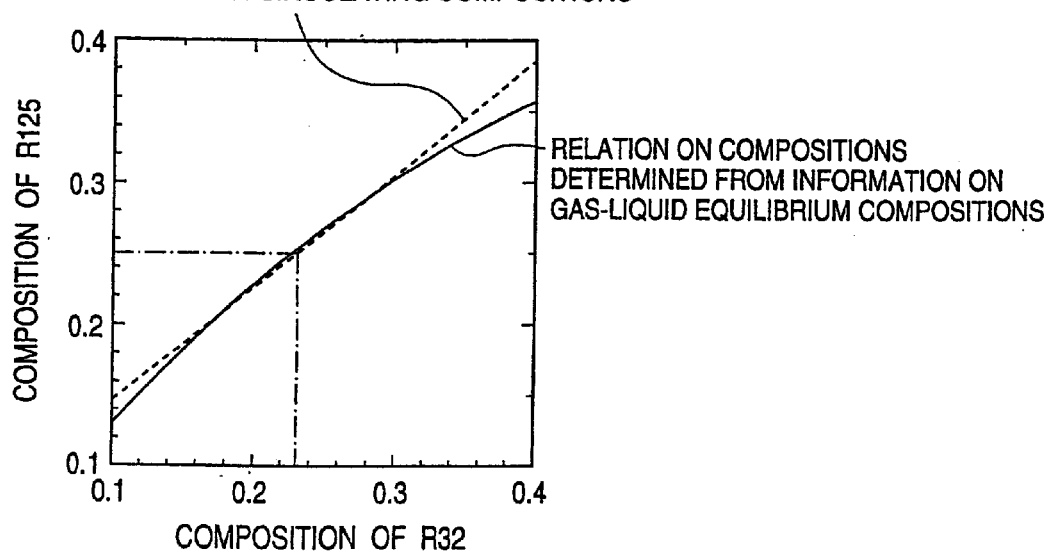
FIG. 14 is a diagram of comparison between the relations on compositions of R.32 and R.125.
Figure 15:
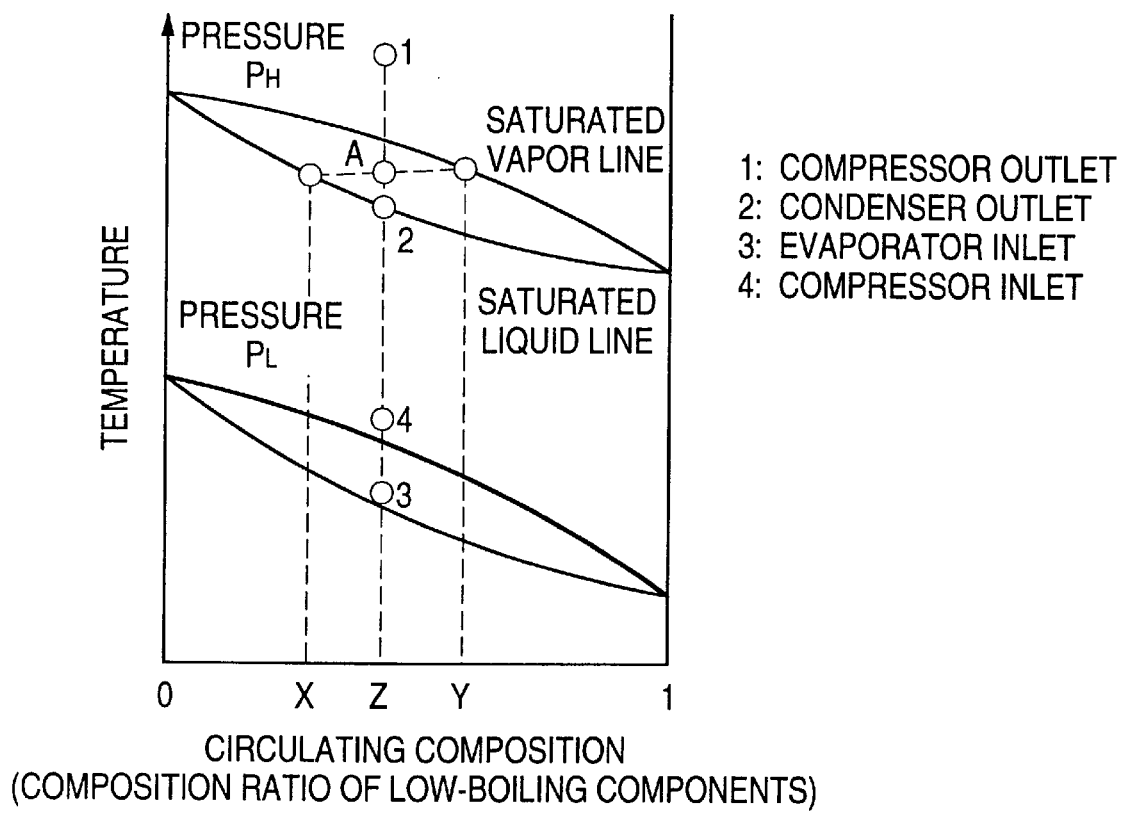
FIG. 15 is a diagram illustrating the operation of a conventional refrigerating and air-conditioning apparatus using a non-azeotropic refrigerant.
Figure 16:
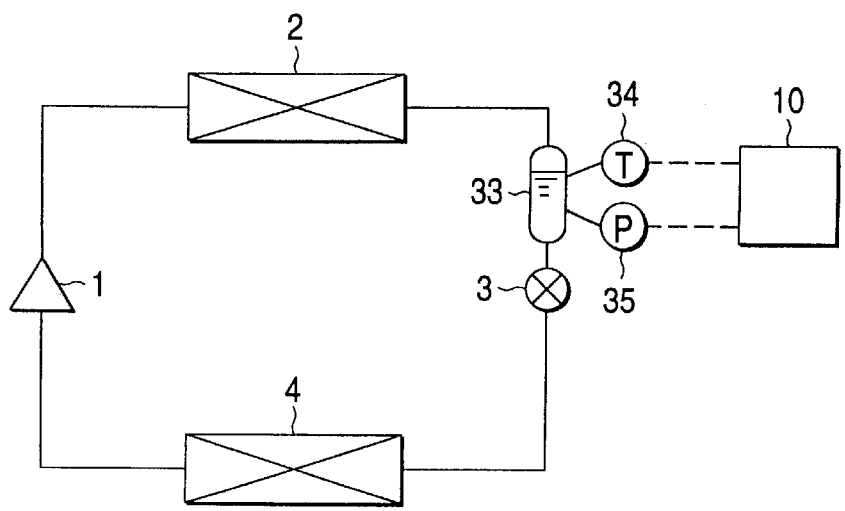
FIG. 16 is a diagram illustrating the operation of a conventional refrigerating and air-conditioning apparatus using a non-azeotropic refrigerant in which two kinds of refrigerants are mixed.
Figure 17:
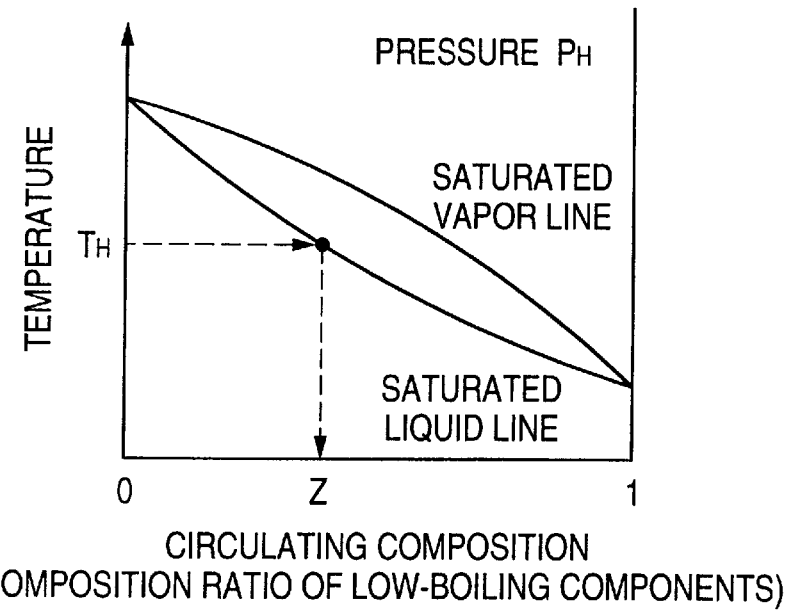
FIG. 17 is a diagram illustrating the conventional basic principle of detection of circulating compositions of the non-azeotropic refrigerant in-which two kinds of refrigerants are mixed.
Figure 18:
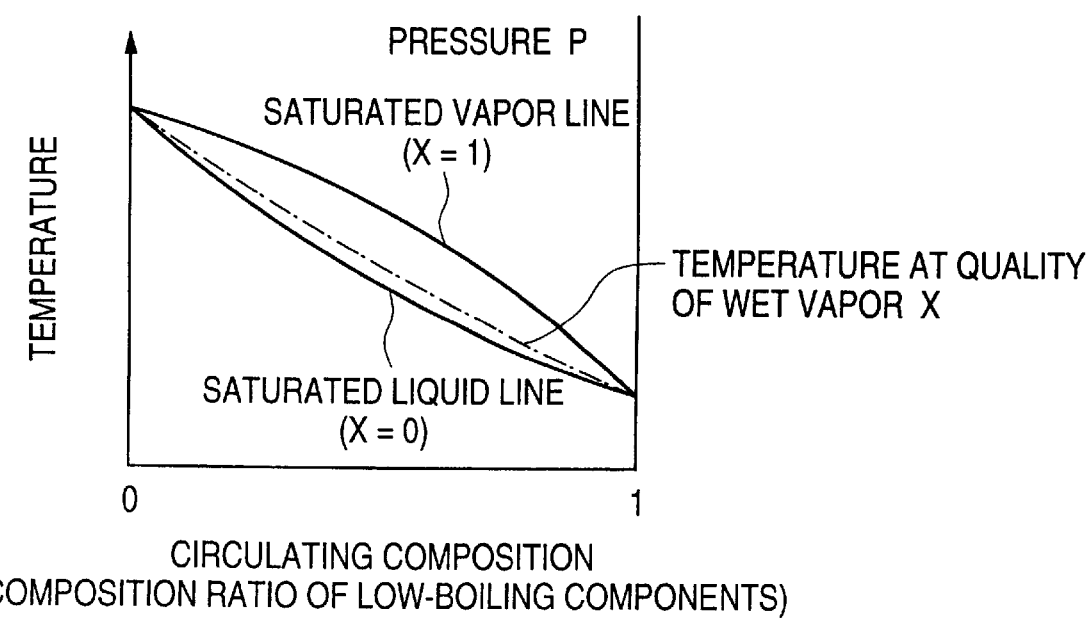
FIG. 18 is a diagram illustrating the conventional basic principle of detection of circulating compositions of the non-azeotropic refrigerant in which two kinds of refrigerants are mixed.
Figure 19:
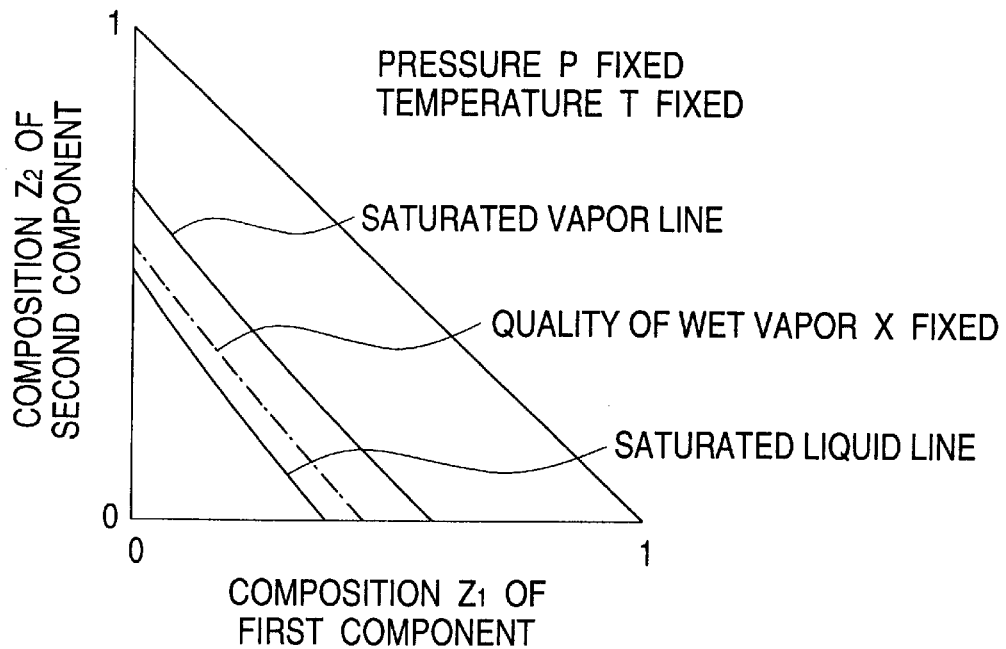
FIG. 19 is a gas-liquid equilibrium diagram of a non-azeotropic refrigerant in which three kinds of refrigerants are mixed.
Figure 20:
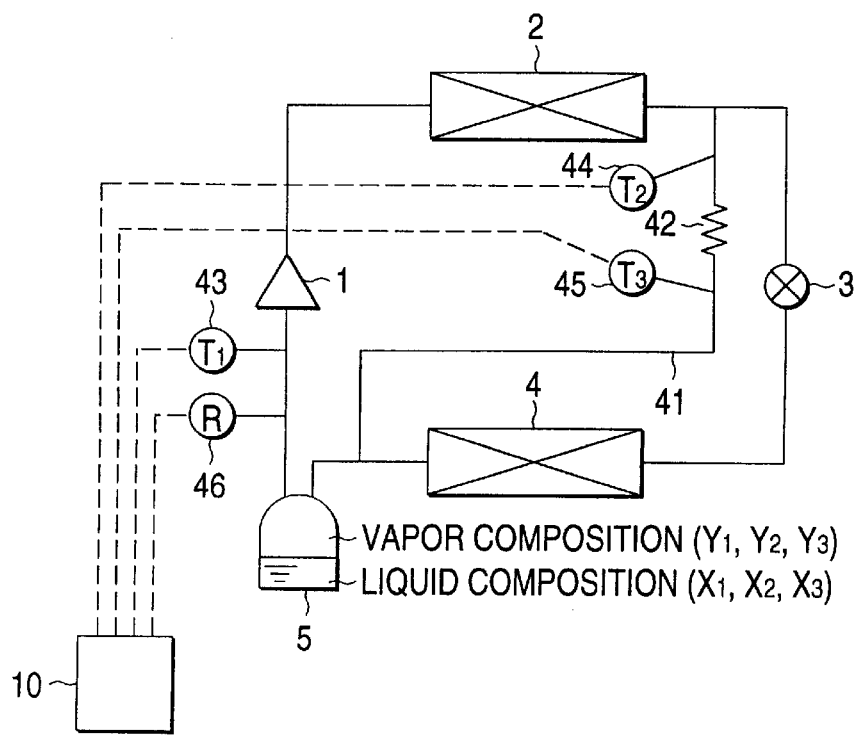
FIG. 20 is a schematic diagram of a conventional refrigerant circuit using a non-azeotropic refrigerant in which three kinds of refrigerants are mixed.
Figure 21:
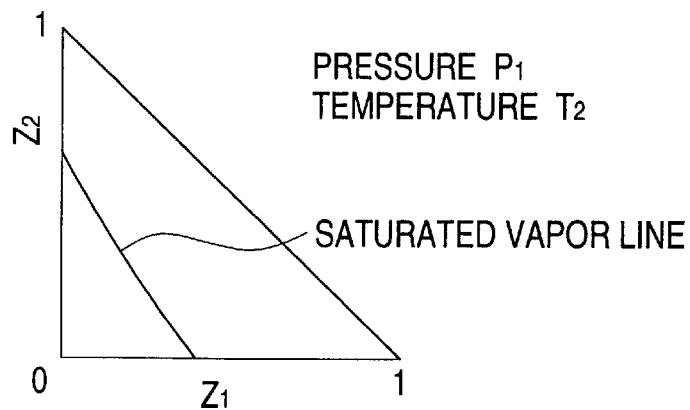
FIG. 21 a gas-liquid equilibrium diagram of a non-azeotropic refrigerant in which three kinds of refrigerants are mixed.
Figure 22:
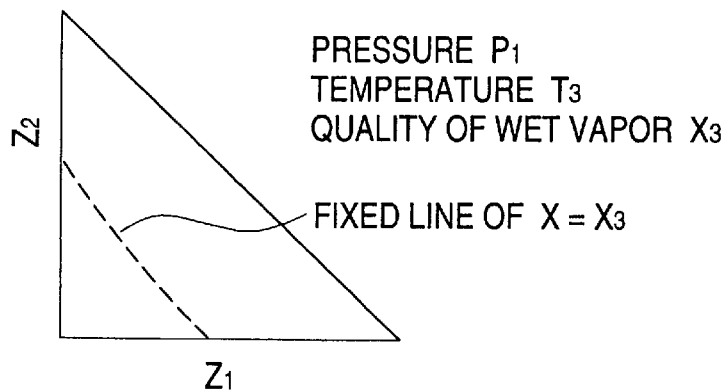
FIG. 22 a gas-liquid equilibrium diagram of a non-azeotropic refrigerant in which three kinds of refrigerants are mixed.

FIG. 14 shows a comparison between, on the one hand, the relation on the compositions of R.32 and R.125 (broken line in FIG. 14) determined from information on the circulating compositions actually measured and shown in FIG. 2 and, on the other hand, the relation on the compositions of R.32 and R.125 (solid line in FIG. 14) in the gas-liquid equilibrium compositions shown in FIG. 13. These two relations on the compositions agree with each other within the range of approximately 2%. Accordingly, even if either expression is used as the relation on the compositions of R.32 and R.125 used for detecting the circulating compositions of R.32, R.125, and R.134a, sufficient accuracy is provided for practical purposes.

When the relation on the compositions of R.32 and R.125 is identified from the information on the circulating compositions, actual measurement information based by an experiment and the like is necessary, but when the relation on the compositions is identified from the gas-liquid equilibrium compositions, the experiment and the like are not necessary. That is, the relation on the compositions can be determined efficiently by storing information on the constituent refrigerants of the mixed refrigerant used and the charged compositions, i.e., by using the physical property values of the refrigerants, and by making calculations by the calculating means of a microcomputer. As described above, in accordance with the present invention, to obtain from the calculating means of the composition calculator the composition ratio of one kind of refrigerant or the relationship concerning the refrigerant composition ratio of a non-azeotropic refrigerant in which a plurality of kinds of refrigerants are mixed by detecting the temperature and pressure of the refrigerant is one operation, and to set in advance the relationship concerning the composition ratio of the non-azeotropic refrigerant in the storage means of the composition calculator is another operation. In addition, in the latter operation, an arrangement can be provided such that the relationship concerning the composition ratio of the non-azeotropic refrigerant is simply determined in advance through an experiment or a simulation and is stored, and after the startup of the operation, the component composition of a specific refrigerant is calculated by the calculating means on the basis of an input, and a comparison is then made with the relation on the component compositions of the refrigerant stored in the storage means, thereby making it possible to determine the circulating compositions of all the refrigerants. Further, in the latter operation, even if a plurality of refrigerants are present, if the relationship concerning the respective two kinds, i.e., the relationship concerning two component compositions of, for example, R.32 and R.125, or R.32 and R.134a, or R.125 and R. 134a, is set in advance as shown in FIG. 2, the circulating compositions of all the refrigerants can be determined by the method of the present invention, including the refrigerant component composition of, for example, R.290 which is an ensuing fourth kind. Therefore, even if there are four or more kinds of refrigerants in the non-azeotropic refrigerant, it is possible to readily determine the circulating compositions of the refrigerants circulating in the refrigeration cycle. That is, in the refrigerating and air-conditioning apparatus in which a refrigerant constituted by a non-azeotropic refrigerant in which N kinds ($N \geq 3$) of refrigerants are mixed is circulated, the circulating compositions are determined by using at least ($N-2$) relations on compositions among a first component to a j-th ($2 \leq j \leq N-1$) component of a non-azeotropic refrigerant.

Advantages of the Invention

As described above, in accordance with the first aspect of the present invention, the refrigerating and air-conditioning apparatus which has at least a compressor, a condenser, a pressure reducing device, and an evaporator and in which a refrigerant constituted by a non-azeotropic refrigerant in which three or more kinds of refrigerants are mixed is circulated, comprises: composition detecting means for obtaining a relationship among component compositions of one or a plurality of refrigerants of the non-azeotropic refrigerant by detecting the temperature and pressure of the refrigerant, and for determining circulating compositions of the refrigerant circulating in a refrigeration cycle by using the relationship among component compositions of the non-azeotropic refrigerant set in advance. Accordingly, the composition of the refrigerant circulating in the refrigeration cycle can be detected accurately, and operation can be effected with high reliability and efficiently.

In the refrigerating and air-conditioning apparatus in accordance with the second aspect of the present invention, the relationship among component compositions of the non-azeotropic refrigerant set in advance is derived from information on circulating compositions obtained from an experiment or a simulation. Accordingly, the composition of the refrigerant circulating in the refrigeration cycle can be detected inexpensively and accurately, and operation can be effected with high reliability and efficiently.

In the refrigerating and air-conditioning apparatus in accordance with the third aspect of the present invention, the relationship among component compositions of the non-azeotropic refrigerant set in advance is derived by information on gas-liquid equilibrium compositions, such as a charged composition and a vapor composition which is in equilibrium with a liquid composition identical to the charged composition, and a liquid composition which is in equilibrium with a vapor composition identical to the charged composition. Accordingly, the composition of the refrigerant circulating in the refrigeration cycle can be detected inexpensively and accurately even if information on actual measurement of the circulating compositions is not available.

In the refrigerating and air-conditioning apparatus in accordance with the fourth aspect of the present invention, a non-azeotropic refrigerant composed of three kinds of refrigerants R.32, R.125, and R.134a is used. Accordingly, operation can be effected with high reliability and efficiently as an R.22-substituting refrigerant machine.

The refrigerating and air-conditioning apparatus in accordance with the fifth aspect of the present invention comprises such as a compressor, a condenser, a pressure reducing device, and an evaporator, and in a refrigerant cycle which uses as a working refrigerant a non-azeotropic refrigerant composed of N kinds ($N \geq 4$) of refrigerants and is provided with composition detecting means for detecting the circulating compositions of the non-azeotropic refrigerant, circulating compositions are determined by using at least ($N-2$) relations on compositions among a first component to a j-th ($2 \leq j \leq N-1$) component of the non-azeotropic refrigerant. Accordingly, the composition of the refrigerant circulating in the refrigeration cycle can be detected inexpensively and accurately, and operation can be effected with high reliability and efficiently.

In the refrigerating and air-conditioning apparatus in accordance with the sixth aspect of the present invention, the at least ($N-2$) relations on compositions among the first component to the j-th ($2 \leq j \leq N-1$) component of the non-azeotropic refrigerant are identified on the basis of circulating composition information obtained from an experiment or a simulation. Accordingly, the composition of the refrigerant circulating in the refrigeration cycle can be detected inexpensively and accurately, and operation can be effected with high reliability and efficiently.

In the refrigerating and air-conditioning apparatus in accordance with the seventh aspect of the present invention, the ($N-2$) relations on compositions among the first component to the j-th ($2 \leq j \leq N-1$) component of the non-azeotropic refrigerant are identified on the basis of information on gas-liquid equilibrium compositions, such as a charged composition and a vapor composition which is in equilibrium with a liquid composition identical to the charged composition, and a liquid composition which is in equilibrium with a vapor composition identical to the charged composition. Accordingly, the composition of the refrigerant circulating in the refrigeration cycle can be detected inexpensively and accurately even if information on actual measurement of the circulating compositions is not available.

In accordance with the eighth aspect of the present invention, in the refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, there is provided a method of determining refrigerant compositions of the refrigerating and air-conditioning apparatus, comprising the steps of: inputting the temperature of a high-pressure liquid refrigerant and the temperature and pressure of a low-pressure gas-liquid two-phase refrigerant in which the high-pressure liquid refrigerant is subjected to isenthalpic expansion; assuming the composition of one component of the non-azeotropic refrigerant; assuming another circulating composition by using a relationship of composition between the component of the non-azeotropic refrigerant whose composition has been assumed and another component; calculating the enthalpy of the high-pressure liquid refrigerant by using an assumed value of the circulating composition and the temperature of the high-pressure liquid refrigerant; and calculating the circulating composition on the basis of the temperature and pressure of the gas-liquid two-phase refrigerant and the high-pressure liquid refrigerant enthalpy and for comparing the same with the assumed value of the circulating composition. Accordingly, efficient operation is possible whatever a combination of refrigerant cycles the apparatus may use.

In accordance with the ninth aspect of the present invention, in the refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, there is provided a method of determining refrigerant compositions of the refrigerating and air-conditioning apparatus, comprising the steps of: inputting the temperature of a high-pressure liquid refrigerant and the temperature and pressure of a low-pressure gas-liquid two-phase refrigerant in which the high-pressure liquid refrigerant is subjected to isenthalpic expansion; calculating the enthalpy of the high-pressure liquid refrigerant by using the temperature of the high-pressure liquid refrigerant; calculating the composition of one component of the non-azeotropic refrigerant on the basis of the temperature and pressure of the gas-liquid two-phase refrigerant and the high-pressure liquid refrigerant enthalpy; and determining the composition of another component by using a relationship of composition between the component of the non-azeotropic refrigerant whose composition has been calculated and the other component. Accordingly, highly reliable and efficient operation is possible using a simple apparatus.

What is claimed is:

1. A refrigerating and air-conditioning apparatus which has at least a compressor, a condenser, a pressure reducing device, and an evaporator and in which a refrigerant constituted by a non-azeotropic refrigerant in which three or more kinds of refrigerants are mixed is circulated, comprising:

composition detecting means for obtaining a relationship among component compositions of one or a plurality of refrigerants of the non-azeotropic refrigerant by detecting the temperature and pressure of the refrigerant, and for determining circulating compositions of the refrigerant circulating in a refrigeration cycle by using the relationship among component compositions of the non-azeotropic refrigerant set in advance.

2. A refrigerating and air-conditioning apparatus according to claim 1, wherein the relationship among component compositions of the non-azeotropic refrigerant set in advance is derived from information on circulating compositions obtained from an experiment or a simulation.

3. A refrigerating and air-conditioning apparatus according to claim 2, wherein a non-azeotropic refrigerant composed of three kinds of refrigerants R.32, R.125, and R.134a is used.

4. A refrigerating and air-conditioning apparatus according to claim 1, wherein the relationship among component compositions of the non-azeotropic refrigerant set in advance is derived by information on gas-liquid equilibrium compositions, such as a charged composition and a vapor composition which is in equilibrium with a liquid composition identical to the charged composition, and a liquid composition which is in equilibrium with a vapor composition identical to the charged composition.

5. A refrigerating and air-conditioning apparatus according to claim 4, wherein a non-azeotropic refrigerant composed of three kinds of refrigerants R.32, R.125, and R.134a is used.

6. A refrigerating and air-conditioning apparatus according to claim 1, wherein a non-azeotropic refrigerant composed of three kinds of refrigerants R.32, R.125, and R.134a is used.

7. In a refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, a method of determining refrigerant compositions of the refrigerating and air-conditioning apparatus, comprising the steps of:

inputting the temperature of a high-pressure liquid refrigerant and the temperature and pressure of a low-pressure gas-liquid two-phase refrigerant in which the high-pressure liquid refrigerant is subjected to isenthalpic expansion;

assuming the composition of one component of the non-azeotropic refrigerant;

assuming another circulating composition by using a relationship of composition between the component of the non-azeotropic refrigerant whose composition has been assumed and another component;

calculating the enthalpy of the high-pressure liquid refrigerant by using an assumed value of the circulating composition and the temperature of the high-pressure liquid refrigerant; and calculating the circulating composition on the basis of the temperature and pressure of the gas-liquid two-phase refrigerant and the high-pressure liquid refrigerant enthalpy and for comparing the same with the assumed value of the circulating composition.

8. In a refrigerating and air-conditioning apparatus which has at least a compressor, a condenser, a pressure reducing device, and an evaporator, and in which a refrigerant constituted by a non-azeotropic refrigerant in which three or more kinds of refrigerants are mixed is circulated, and which has composition detecting means for detecting circulating compositions of the refrigerant, a method of determining refrigerant compositions of the refrigerating and air-conditioning apparatus, comprising the steps of:

inputting the temperature of a high-pressure liquid refrigerant and the temperature and pressure of a low-pressure gas-liquid two-phase refrigerant in which the high-pressure liquid refrigerant is subjected to isenthalpic expansion;

calculating the enthalpy of the high-pressure liquid refrigerant by using the temperature of the high-pressure liquid refrigerant;

calculating the composition of one component of the non-azeotropic refrigerant on the basis of the temperature and pressure of the gas-liquid two-phase refrigerant and the high-pressure liquid refrigerant enthalpy; and determining the composition of another component by using a relationship of composition between the component of the non-azeotropic refrigerant whose composition has been calculated and the other component.

* * * * *